United States Patent
Callendar et al.

[15] 3,686,670
[45] Aug. 22, 1972

[54] RECEIVER FOR USE WITH A DIRECTION FINDING OR RADAR RECEIVING SYSTEM

[72] Inventors: Max V. Callendar, Southend-on-sea; Victor J. Cox, Thorpe Bay, both of England

[73] Assignee: Pye Limited, Cambridge, England

[22] Filed: March 19, 1970

[21] Appl. No.: 20,982

[30] Foreign Application Priority Data

March 28, 1969 Great Britain..........16,469/69

[52] U.S. Cl. ............................343/113 R, 343/16 R
[51] Int. Cl..................................................G01s 3/48
[58] Field of Search............................343/113, 16 R

[56] References Cited

UNITED STATES PATENTS

| | | | |
|---|---|---|---|
| 2,996,712 | 8/1961 | Richman | 343/113 |
| 3,106,709 | 10/1963 | Hefley et al. | 343/113 |
| 3,325,813 | 6/1967 | Quick et al. | 343/113 |

FOREIGN PATENTS OR APPLICATIONS

1,005,577  4/1957  Germany

*Primary Examiner*—Benjamin A. Borchelt
*Assistant Examiner*—Richard E. Berger
*Attorney*—Beveridge & De Grandi

[57] ABSTRACT

A receiver for use with a direction finding or radar receiving system has a directional aerial array comprising at least two aerials. The receiver is arranged to produce an output in response to a signal received by the aerial array, the output indicating the direction of the source of the signal, relative to the aerial array, and comprises processors to derive from the signals received by each aerial of the array respective trains of pulses, the pulses of each train being in a predetermined phase relationship with the carrier waveform of the respective received signal, so that the output is a function of the time difference between the occurrence of pulses in one train and the occurrence of pulses in at least one other said train the output having a maximum amplitude when the time difference tends to zero.

13 Claims, 9 Drawing Figures

Patented Aug. 22, 1972

Inventors
MAX VICTOR CALLENDAR & VICTOR JAMES COX
By Beveridge + DeGrandi
Attorneys Patented Aug. 22, 1972

Inventors

MAX VICTOR CALLENDAR & VICTOR JAMES COX

By
Beveridge + DeGrandi
Attorneys

3,686,670

RECEIVER FOR USE WITH A DIRECTION FINDING OR RADAR RECEIVING SYSTEM

This invention relates to a receiver for use with a direction finding system or radar receiving system and to a system incorporating such a receiver.

According to the present invention there is provided a receiver for use with a system having a directional aerial array comprising at least two aerials, the receiver having means to accept signals received by the aerial array and to produce an output in response thereto, the output indicating the direction of the source of the signal, as hereinafter defined, relative to the aerial array, the receiver comprising processor means to derive from the signals received by each aerial of the array respective trains of pulses, the pulses of each train being in a predetermined phase relationship with the carrier waveform of the respective received signal, means to produce said output being a function of the time difference between the occurrence of pulses in one train and the occurrence of pulses in at least one other said train, the output having a maximum amplitude when the time difference tends to zero, a superheterodyne mixer means having a common heterodyne oscillator for mixing the received signal originating from each aerial the superheterodyne mixer means significantly reducing the frequency of the carrier waveform of the received signals without changing the phase difference therebetween.

By the term "the source of the signal" we mean either a transmitter of signals such as a direction finding beacon, or a target which reflects signals transmitted by a radar transmitter, such a reflected echo constituting a signal.

Preferably the receiver is adapted to produce said output only when said time difference tends to zero.

The processor means may be adapted to derive the pulses from the alternate nodes of the carrier waveform of the respective received signal.

The processor means may be adapted to shape and to differentiate with respect to time each said received signal waveform to produce said respective trains of pulses.

The receiver may comprise coincidence means to multiply or add the amplitudes of respective pulses of each train which respective pulses tend to coincidence as the time difference tends to zero, and to thereby produce said output.

The receiver when for use with a radar receiving system may comprise sensing means to sense the amplitude of the received signals as an indication of the size or density of the target.

The processor means may be such that the said pulses do not significantly vary in amplitude with variations in the amplitude of the received signals said sensing means sensing the amplitude of the received signal originating from at least one of the aerials before the respective train of pulses is derived therefrom, means being provided to modulate the amplitude of said output in response to the sensing means.

In another aspect, the invention provides a direction finding or radar receiving system comprising a directional aerial array having at least two aerials and a receiver as set forth above, being adapted to indicate the direction of the source of a signal as hereinbefore defined relative to the array.

The aerial array may comprise at least three aerials, and the system may be adapted to indicate the direction of said source relative to the aerial array in two dimensions.

The directional sensitivity of the array may be such that in operation the receiver produces an output only when the wavefront of the signal is received by each aerial substantially simultaneously.

The system may have two aerials of equal size each of which is an array of dipoles, the aerials being arranged side by side with their phase centers disposed a distance apart equal to the width of each aerial.

Alternatively the system may have two aerials of equal size each of which is an array of dipoles, the aerials being disposed side by side but overlapped such that the phase centers of the aerials are disposed a distance apart equal to half the width of each aerial.

The invention will be specifically described merely by way of example with reference to the accompanying drawings, wherein.

Among known direction finding and radar receiving systems, there may be distinguished two types:

a. Those employing an aerial array or a parabolic dish aerial arranged so as to show a peak in the response to a distant signal at a certain angle as the aerial system is rotated or scanned.

b. Those employing two or more aerials, a difference in amplitude or phase between the outputs of which in response to a distant signal falls sharply to zero at a certain angle as the aerial array is rotated or scanned. A similar result is obtained by using one aerial the direction of which is made to oscillate in conjunction with synchronized switching.

In systems of group (a) the angular resolution of the system is a function of the total aperture or main physical dimension of the aerial array, and the resolution cannot be improved except by using an aerial large in relation to the wavelength of the signal received. In systems of group (b), on the other hand, improvement in the resolution of the system is possible, but the form of the output obtained is unsuitable for many purposes. With systems of this type, as the aerial array is turned through the correct bearing of the signal being received, the output voltage waveform is in the form of an "S" curve, the output voltage corresponding to the correct bearing being the point in the center of the "S" curve where the curve passes through zero. Because the significant part of the curve is this zero, systems of this group are unsuitable for use as plan position indicator radar systems and in direction finding systems. An attempt by means of added circuitry to convert the zero into a sharp peak would result in other spurious peaks appearing, with the result that the distant signal may be indicated to be at an incorrect bearing, and interpretation of a plan position indicator display is rendered difficult.

The present invention seeks to avoid one or more of the abovementioned disadvantages.

Figure 1:
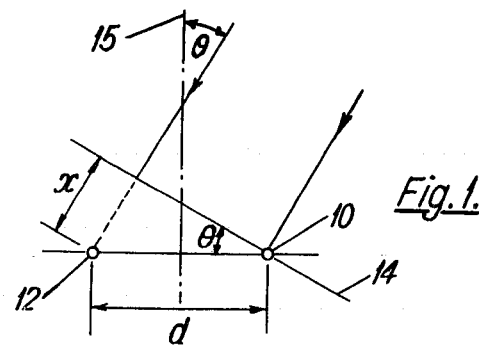
FIG. 1 illustrates the theory of the invention.

FIG. 1 illustrates the theory of the invention and shows a directional aerial array comprising two aerials 10, 12 which are spaced a distance $d$ apart. A wavefront 14 of a signal from a distant source such as a direction finding beacon or a reflective radar target is shown approaching the aerials 10, 12 at an angle $\theta$ to the plane of the aerials, this angle also being the bearing of the source of the signal relative to the axis of view 15 of the aerials. It will be noted that the wavefront 14 has just reached the aerial 10, but still has to travel a distance $x$ before it reaches the aerial 12. Consequently, there is a small but finite time interval between the receipt of the wavefront 14 by the aerial 10 and by the aerial 12.

The time interval is given by $\Delta T = x/c = (d \sin \theta)/c$ where $c$ is the velocity of the wavefront.

Thus $\Delta T = (d \sin \theta)/\lambda f_o = \Delta \phi / 2\pi f_o$ where $\lambda$ is the wave length of the carrier waveform of the signal, $f_o$ is its frequency and $\Delta \phi$ is the apparent phase difference between the signal as sensed by the aerial 10 and as sensed by the aerial 12.

Figure 2A:
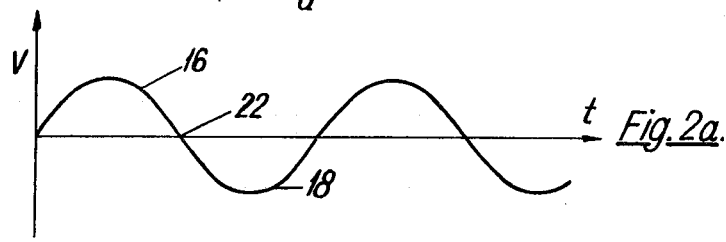
FIGS. 2a, 2b, 2c illustrate the formation of pulses from the received signal carrier waveform.
Figure 2B:
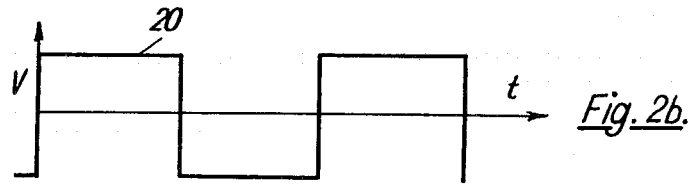
Figure 2C:
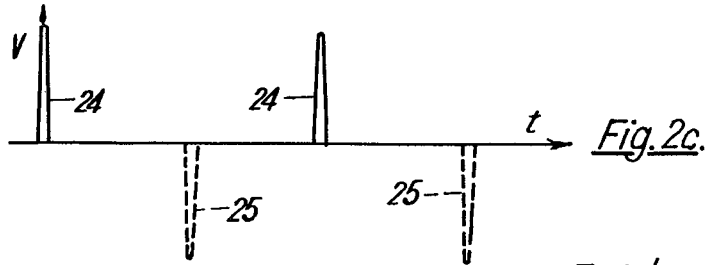

The signals received in each aerial 10, 12 are separately amplified and are processed in respective processors to form a train of pulses for each received signal. FIGS. 2a, 2b, 2c illustrate the action of the processors.

Referring to FIG. 2a the received signal consists of a carrier waveform 16 upon which amplitude modulation may be impressed if desired. For simplicity, the amplitude modulation is not shown in FIG. 2a. The processor amplifies the carrier waveform, and shapes it into a square wave 20 having step changes corresponding to the nodes 22 of the carrier waveform. The processor includes a differentiator which differentiates this square wave to produce a train of pulses 24 derived from the nodes. Thus, the train of pulses 24 is in a predetermined phase relationship with the received signal waveform from which it is derived. The negative-going pulses 25 of the train are not required and are biassed off. Thus the train of pulses from the pressure is derived from alternate nodes.

Figures 3A, 3B:
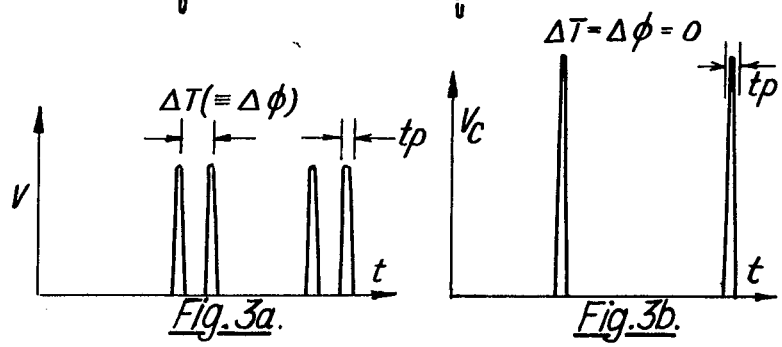
FIGS. 3a and 3b show the coincidence and non-coincidence of pulses derived from respective aerials.

Since there is a phase difference between the received signal, from the aerial 10 and the aerial 12, there is a corresponding time difference between individual pulses 24 of the pulse trains derived from the respective aerials 10 and 12, as shown in FIG. 3a. Since this time difference is a function of the bearing of the source of the signal relative to the aerials 10, 12, it will be appreciated that the time difference between the pulses 24 may be indicated at the receiver output by a suitable cathode ray tube, by connecting the trains of pulses 24 across the Y-deflection input thereof. When the time difference between the pulses 24 of each train tends to zero, their amplitudes become added together and the pulse displayed on the screen of the cathode ray tube is of maximum amplitude. The orientation of the aerial array is thus adjusted until the time difference between the pulses 24 tends to zero and the bearing can then be established from the orientation of the aerial array.

Alternatively, the receiver comprises a coincidence detector means to multiply together or add the amplitudes of pulses respective of each train which respective pulses tend to coincidence as the time difference tends to zero, as shown in FIG. 3b.

It will be appreciated that the time difference between the pulses 24 of each train is zero not only when corresponding pulses of each train are coincident, but also when the time difference is such that the pulses 24 of one train are coincident with pulses 24 of another train that is in fact out of phase with the first-mentioned train by $2\pi$, $4\pi$, etc. The spurious bearing indications that would be produced by the receiver in these circumstances are suppressed by suitably designing the aerial array as described hereafter.

If the duration of each pulse 24 is taken to be $t_p$, then the output $v_c$ of the coincidence detector will fall to zero when the time difference between the arrival of the signal pulse wavefront 14 and the aerials 10, 12 is equal to $t_p$, that is to say when $\sin \theta = ct/d$. Thus, $ct_p/d$ may be considered to be the angular resolution $\theta_r$ of the system.

Of course, the coincidence detector will also indicate coincidence when $\Delta T$ is such that $\Delta \phi = 2\pi$, $4\pi$, etc. corresponding to bearings of the source of the signal where $\sin \theta = \lambda/d$, $2\lambda/d$, etc. and $\Delta T = 1/f_o$, $2/f_o$, etc.

The above-outlined theoretical basis for the system only provides a moderate angular resolution $\theta_r$, since the duration $t_p$ of the pulses 24 has to be very small to obtain a high angular resolution. For a resolution $\theta_r$ of 1°, and for an aerial spacing $d$ of 3 cm., equivalent to 10 wave lengths at a signal carrier frequency of 10 Gc/s, it will be seen that $\Delta T = 16$ picoseconds and hence the required duration of the pulses 24 is 16 picoseconds also. It is undesirable to increase the dimension $d$, since it results in the spurious responses corresponding to $\Delta \phi = 2\pi$, $4\pi$, etc. occurring at bearings closer to the desired bearing. When $d = 10\lambda$, these outputs are at intervals of $\theta$ of 6° from the bearing $\theta = 0$. These unwanted outputs are removed by designing the aerial to have nulls in its directional sensitivity pattern at values of $\theta$ corresponding to the outputs as described hereafter.

In order to increase the angular resolution of the system, it is desirable to employ superheterodyne mixer circuits for each aerial 10, 12. The superheterodyne circuits are arranged to receive a heterodyne frequency from a common heterodyne oscillator, so that the frequency of the carrier waveform of the received signal is reduced to a relatively low intermediate frequency without the relative phase of the carrier waveforms being changed. Since the phase difference between the carrier waveforms is unchanged, but their frequency is greatly reduced, the duration of the pulses 24 can be greatly increased while maintaining the angular resolution of the system. Thus, $t_p = (dn \sin \theta_r)/c$. where $n$ is the ratio of the radio frequency of the carrier waveform of the signal to the intermediate frequency of the carrier waveform.

Thus, by reducing a radio frequency carrier waveform of 10 Gc/s to an intermediate frequency of 10 Mc/s, for example, the angular resolution of the system $\theta_r$ may be made as small as 0.1° for $d = 10\lambda$, with a duration $t_p$ of the pulses 24 of 1.6 nanoseconds. This is a quite practicable duration for the pulses 24; for example, if the amplitude of the intermediate frequency carrier waveform is 1 volt, then amplification by 46 decibels with consequent heavy clipping, gives a rate of rise of voltage in the pulses 24 of 1 volt per nanosecond. This requires a current of 10 milliamps if the lead is 10 pf. A circuit employing a 10 pf capacitor and a 100 ohm resistor provides a similar rate of decay for the termination of the pulses 24.

In order to eliminate the unwanted outputs of the coincidence circuit that occur when $\sin \theta = d/\lambda$, $2d/\lambda$, etc., the directional sensitivity of the aerial array is arranged to be such that it is insensitive to signals arriving at the array from bearings of $\theta$ for which $\sin \theta = d/\lambda$, $2d/\lambda$, etc. Tow examples of suitable aerials are shown in FIGS. 4 and 5.

Figure 4:
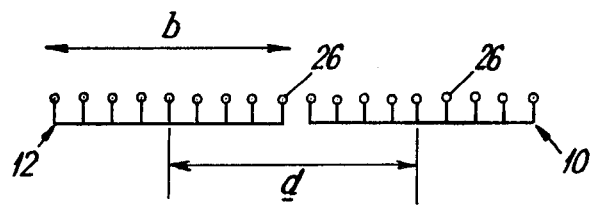
FIGS. 4 and 5 show aerials for use in the invention in diagrammatic form.
Figure 5:
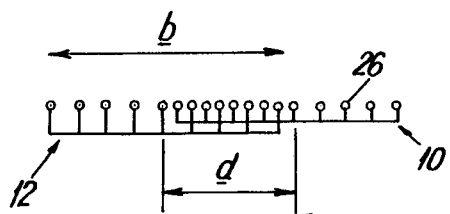

Referring to FIG. 4, each aerial 10, 12 consists of a broadside array of dipoles 26, of equal size and of width $b$, the arrays being arranged side by side with their phase centers disposed a distance $d$ apart.

It will be appreciated that an aerial having an appreciable width $b$ will, when $\theta$ is not zero, receive the signal at one edge earlier than at the other edge, with the result that there is a phase difference in voltages induced in dipoles at opposite edges of the aerial. However, the resultant phase angle of the sum of the induced voltages in all the dipoles is in phase with the voltage that would be induced in a single dipole at the center of the aerial, and thus the center of the aerial is its phase center. Of course, the phase center for other types of aerial can be determined in a similar way.

With an array as in FIG. 4 it is found that nulls in the directional sensitivity pattern of the array occur at angles given by $\sin \theta = b/\lambda$, $2b/\lambda$, etc. Thus, by making $b=d$, which means that the aerials are immediately adjacent as shown in FIG. 4, it is possible to make use of the nulls to cancel the outputs from the receiver corresponding to signals arriving at the arrays from bearings at angles $\theta$ for which $\sin \theta = d/\lambda$, $2d/\lambda$, etc. We have found that by using an array in which $b = 1$ ft, and giving 12° total beam width, an angular resolution $\theta_r$ of 0.1° can be obtained.

Rectangular horn aerials and equivalent parabolic types can be designed to show nulls located at well-defined angles, and can then be designed for "uniform illumination" to cancel or at least significantly reduce the spurious outputs. Or course, the receiver itself will eliminate spurious responses derived from the side lobes of the aerial sensitivity patterns.

Referring to FIG. 5, there is shown a more compact aerial array suitable for use in the invention. The aerials 10, 12 are overlapped so that the distance $d$ between their phase centers is equal to $0.5\ b$. With this aerial array, the receiver outputs corresponding to $\sin \theta = d/\lambda$, $2d/\lambda$, etc. are eliminated by alternate nulls of the directional sensitivity pattern. In order to avoid decreasing the angular resolution $\theta_r$ of the system the duration $t_p$ of the pulses 24 should be halved compared to their length when an aerial such as shown in FIG. 4 is used.

Figure 6:
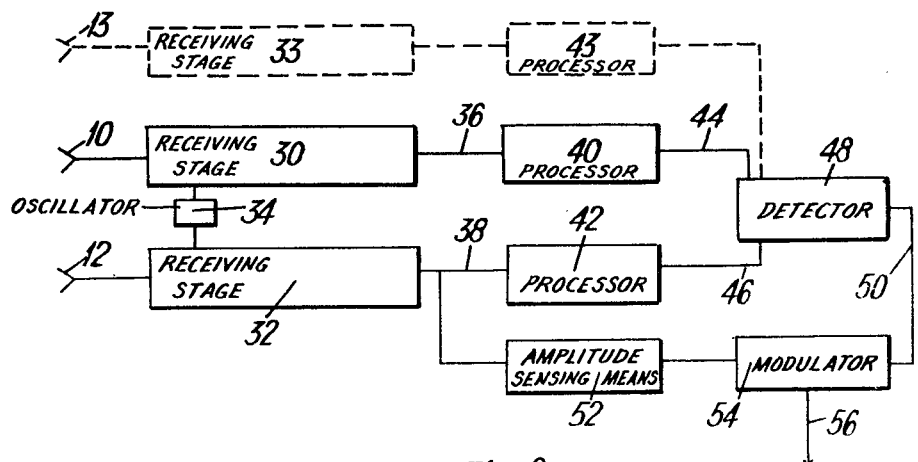
FIG. 6 shows a receiver according to the invention in block diagram form.

FIG. 6 shows in block diagram form a radar receiver according to the invention, and embodying the principles discussed hereinbefore. The aerials 10, 12 are preferably of the type shown in FIG. 4 and feed radio frequency signals to respective receiving stages 30 and 32. Each stage 30, 32 embodies a superheterodyne circuit, the circuits being supplied with heterodyne frequency from a common heterodyne oscillator 34. Respective intermediate frequency received signals are thereby produced, and amplified in intermediate frequency amplifiers incorporated in the stages 30, 32. Amplified intermediate frequency received signals are thus produced on respective output lines 36 and 38.

The output lines 36, 38 feed the respective received signals to respective processors 40, 42 which operate as hereinbefore described to produce respective trains of pulses 24 on respective output lines 44, 46.

The output lines 44, 46 feed the trains of pulses 24 to a coincidence detector 48 which produces a coincidence output on a line 50 only when the time between the pulses 24 of each train is substantially zero. The amplitude of the output of the coincidence detector 48 does not vary with the amplitude of the received signals on the lines 36, 38 due to the clipping that has occurred in the processors 40, 42.

Therefore, the received signals on line 38 are also fed to an amplitude sensing means 52 which embodies rectifier circuits and which senses the amplitude of the received signal pulses. The output of the sensing means 52 is D.C. and is fed to a modulator 54 which also receives the output of the coincidence detector 48. The modulator 54 modulates the output of the coincidence detector 48 according to the amplitude of the received signal pulses, as represented by the D.C. level of the signal from the sensing means 52. It will be appreciated that the amplitude of the received signal pulses is indicative of the size or density of the target which reflects the signals to the aerials 10, 12.

The modulator 54 provides an output 56 to a display which may be of any conventional type such as a plan position indicator, in which case there may be provided conventional range determining circuits.

It will be appreciated that the system may easily be developed to indicate direction in two dimensions (e.g. in both bearing and azimuth). For this purpose, an extra aerial 13 is required, and also an extra receiving stage 33 and an extra processor 43 corresponding to the receiving stages 30, 32 and the processor means 40, 42. The coincidence detector 48 is then a triple coincidence detector, such as is known to those skilled in the art. The receiving stage 33 embodies a superheterodyne circuit identical to that of the stages 30, 32, and is supplied with heterodyne frequency from the same oscillator 34.

Also, it will be appreciated that instead of a single aerial 10 and a single aerial 12, there may be provided two or more aerials corresponding to each of the aerials 10, 12, and connected together to have functionally the same performance. Similarly, the third aerial 13 required for two-dimensional operation may be similarly constructed from two or more aerials.

In practice, the bearing accuracy obtainable, but not the sharpness of the response, is limited by the constancy of the delay that the received signals suffer as they pass through the receiving and processing stages 30, 40 etc. An error in the bearing indicated of 0.1° will be incurred if one path 30, 40 through the receiver drifts relatively to the other path (e.g. 32, 42) as follows:

a. The phase difference drifts by 6° in either the radio frequency (10 Gc/s) or the intermediate frequency (10 Mc/s) sections or
  b. The delay drifts by 1.5 picoseconds in the radio frequency section or by 1.5 nanoseconds in the intermediate frequency section.

These drifts correspond to a drift of 1 percent in either the inductance or the capacitance of a tuned circuit (either radio or intermediate frequency) having a $Q = 10$, or to a change in length of 0.5 mm. of a wave guide or cable or wire in the radio frequency section. Corresponding changes in conductor lengths in the intermediate frequency section are 50 cm. and of course can be neglected.

We claim:

1. A receiver for use with a system having a directional aerial array comprising at least two aerials the receiver having means to accept signals received by the aerial array and to produce an output in response thereto, the output indicating the direction of the source of said signals relative to the aerial array, the receiver comprising processor means to derive from the signals received by each aerial of the array respective trains of pulses, the pulses of each train being in a predetermined phase relationship with the carrier waveform of the respective received signal, means to produce said output as a function of the time difference between the occurrence of pulses in one train and the occurrence of pulses in at least one other said train the output having a maximum amplitude when the time difference tends to zero, and superheterodyne mixer means having a common heterodyne oscillator for mixing the received signals accepted from each aerial, the superheterodyne mixer means substantially reducing the frequency of the carrier waveform of the received signals without changing the phase difference therebetween.

2. A receiver as claimed in claim 1 wherein the means to produce said output is adapted to produce said output only when said time difference tends to zero.

3. A receiver as claimed in claim 1 wherein the processor means comprises means to derive the pulses from alternate nodes of the carrier waveform of the respective received signal.

4. A receives as claimed in claim 1 wherein the processor means comprises means to shape and to differentiate with respect to time each said received signal waveform to produce said respective trains of pulses.

5. A receives as claimed in claim 1 wherein the means to produce said output comprises coincidence means to add the amplitudes of respective pulses of each train which respective pulses tend to coincidence as the time difference tends to zero.

6. A receiver as claimed in claim 1 further including sensing means to sense the amplitude of the received signals.

7. A receiver as claimed in claim 6 wherein the pulses produced by the processor means do not significantly vary in amplitude with variations in the amplitude of the received signals said sensing means sensing the amplitude of the received signal accepted from at least one of the aerials before the respective train of pulses is derived therefrom, means being provided to modulate the amplitude of said output in response to the sensing means.

8. A system having a directional aerial array comprising at least two aerials, and a receiver to produce an output in response to a signal received by the aerial array, the output indicating the direction of the source of said signals relative to the aerial array, the receiver comprising processor means to derive from the signals received by each aerial of the array respective trains of pulses, the pulses of each train being in a predetermined phase relationship with the carrier waveform of the respective received signal, means to produce an output which is a function of the time difference between the occurrence of pulses in one train and the occurrence of pulses in at least one other said train the output having a maximum amplitude when the time difference tends to zero, and superheterodyne mixer means having a common heterodyne oscillator for mixing the received signals accepted from each aerial, the superheterodyne mixer means significantly reducing the frequency of the carrier waveform of the received signals without changing the phase difference therebetween.

9. A system as claimed in claim 8 wherein the aerial array comprises at least three aerials, whereby to indicate the direction of said source relative to the aerial array in two dimensions.

10. A system as claimed in claim 8 wherein the array has a directional sensitivity whereby the receiver produces an output only when the wavefront of the signal is received by all aerials substantially simultaneously.

11. A system as claimed in claim 9 wherein the array comprises two aerials of equal size each of which is an array of dipoles, the aerials being arranged side by side with their phase centers disposed a distance apart equal to the width of each aerial.

12. A system as claimed in claim 8 wherein the array comprises two aerials of equal size each of which is an array of dipoles, the aerials being disposed side by side but overlapped such that the phase centers of the aerials are disposed a distance apart equal to half the width of each aerial.

13. A receiver as claimed in claim 1 wherein the means to produce said output comprises coincidence means to multiply the amplitudes of respective pulses of each train which respective pulses tend to coincidence as the time difference tends to zero.

* * * * *